United States Patent
Trombley et al.

(10) Patent No.: US 7,127,346 B1
(45) Date of Patent: Oct. 24, 2006

(54) DYNAMIC ENGINE PUMPING WORK ESTIMATION ALGORITHM

(75) Inventors: Douglas E. Trombley, Hartland, MI (US); Kenneth J. Buslepp, Brighton, MI (US); John M. Gunselman, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/218,982

(22) Filed: Sep. 2, 2005

Related U.S. Application Data

(60) Provisional application No. 60/693,246, filed on Jun. 23, 2005.

(51) Int. Cl.
 *F02D 41/12* (2006.01)
 *G06F 19/00* (2006.01)

(52) U.S. Cl. .......................... 701/110; 701/54; 123/325
(58) Field of Classification Search ................ 701/110, 701/114, 102, 54; 123/325, 480; 477/62, 477/154
 See application file for complete search history.

(56) References Cited

U.S. PATENT DOCUMENTS 6,876,918 B1 * 4/2005 Kabe et al. ................. 701/110

FOREIGN PATENT DOCUMENTS

EP 1 347 163 A1 * 9/2003
JP 63-147957 A * 6/1988

* cited by examiner

*Primary Examiner*—Hieu T. Vo
(74) *Attorney, Agent, or Firm*—Christopher DeVries

(57) ABSTRACT

An engine control system that regulates operation of an engine includes an intake valve that regulates air intake into a cylinder of the engine and an exhaust valve that regulates exhaust from the cylinder. A control module determines a cylinder volume at intake valve closure and a cylinder volume at intake valve opening and calculates an intake pumping torque based on the cylinder volume at intake valve closure and the cylinder volume at intake valve opening. The control module determines a cylinder volume at exhaust valve closure and a cylinder volume at exhaust valve opening and calculates an exhaust pumping torque based on the cylinder volume at exhaust valve closure and the cylinder volume at exhaust valve opening. The control module calculates a net pumping torque based on the intake pumping torque and the exhaust pumping torque and regulates engine operation based on the net pumping torque.

19 Claims, 3 Drawing Sheets

DYNAMIC ENGINE PUMPING WORK ESTIMATION ALGORITHM

CROSS-REFERENCE TO RELATED APPLICATIONS

This application claims the benefit of U.S. Provisional Application No. 60/693,246 filed on Jun. 23, 2005. The disclosure of the above application is incorporated herein by reference.

FIELD OF THE INVENTION

The present invention relates to internal combustion engines, and more particularly to calculating dynamic engine pumping work for torque-based engine control.

BACKGROUND OF THE INVENTION

Internal combustion engines combust an air/fuel mixture to produce drive torque. More specifically, air is drawn into cylinders of the engine and is combined with fuel therein. The air/fuel mixture is compressed by a piston and is ignited to drive the piston within the cylinder. The combustion product or exhaust is exhausted from the cylinder and a fresh air/fuel mixture is prepared for subsequent combustion. Engine pumping work is required to drive the intake and exhaust, which detracts from the engine torque output. Therefore, engine pumping work must be considered when regulating engine operation.

A valvetrain regulates air intake and exhaust to and from the cylinders. Traditional engines include fixed valvetrains, whereby intake and exhaust valve opening and closing occur relative to respective crankshaft angles. Thus, traditional engine control systems incorporate calibrated look-up tables that provide engine operation information including, but not limited to, engine pumping work. In this manner, engineers calibrate look-up tables for a specific engine type, and the engine control system regulates operation of the engine based on the look-up table.

However, more modern engine control systems have become increasingly complex. For example, engines can include variable lift and valve timing mechanisms that adjust intake and exhaust valve opening and closing relative to the crankshaft angle based on engine operating conditions. As a result, look-up calibration for adjustable valvetrain engines has been compounded, which increases overall system cost. Alternatively, the look-up tables have been simplified. This, however, decreases accuracy of engine operation.

SUMMARY OF THE INVENTION

Accordingly, the present invention provides an engine control system that regulates operation of an engine. The engine control system includes an intake valve that regulates air intake into a cylinder of the engine and an exhaust valve that regulates exhaust from the cylinder. A control module determines a cylinder volume at intake valve closure and a cylinder volume at intake valve opening and calculates an intake pumping torque based on the cylinder volume at intake valve closure and the cylinder volume at intake valve opening. The control module determines a cylinder volume at exhaust valve closure and a cylinder volume at exhaust valve opening and calculates an exhaust pumping torque based on the cylinder volume at exhaust valve closure and the cylinder volume at exhaust valve opening. The control module calculates a net pumping torque based on the intake pumping torque and the exhaust pumping torque and regulates engine operation based on the net pumping torque.

In other features, the control module determines a crankshaft intake closure angle at intake valve closure. The cylinder volume at intake valve closure is determined based on the crankshaft intake closure angle. The control module determines a crankshaft intake opening angle at intake valve opening, wherein the cylinder volume at intake valve opening is determined based on the crankshaft intake opening angle. An intake camshaft regulates opening and closing of the intake valve relative to a crankshaft angle and a sensor monitors an intake camshaft angle. The control module determines the crankshaft angle based on the intake camshaft angle and each of the crankshaft intake closure angle and the crankshaft intake opening angle are determined based on the crankshaft angle.

In other features, the control module determines a crankshaft exhaust closure angle at exhaust valve closure. The cylinder volume at exhaust valve closure is determined based on the crankshaft exhaust closure angle. The control module determines a crankshaft exhaust opening angle at exhaust valve opening. The cylinder volume at exhaust valve opening is determined based on the crankshaft exhaust opening angle. An exhaust camshaft regulates opening and closing of the exhaust valve relative to a crankshaft angle and a sensor monitors an exhaust camshaft angle. The control module determines the crankshaft angle based on the exhaust camshaft angle. Each of the crankshaft exhaust closure angle and the crankshaft exhaust opening angle are determined based on the crankshaft angle.

In still another feature, the engine control system further includes a manifold absolute pressure sensor that monitors a manifold absolute pressure of an intake manifold of the engine. The intake pumping torque is calculated based on said manifold absolute pressure.

In yet another feature, the control module determines an exhaust pressure. The exhaust pumping torque is calculated based on the exhaust manifold absolute pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
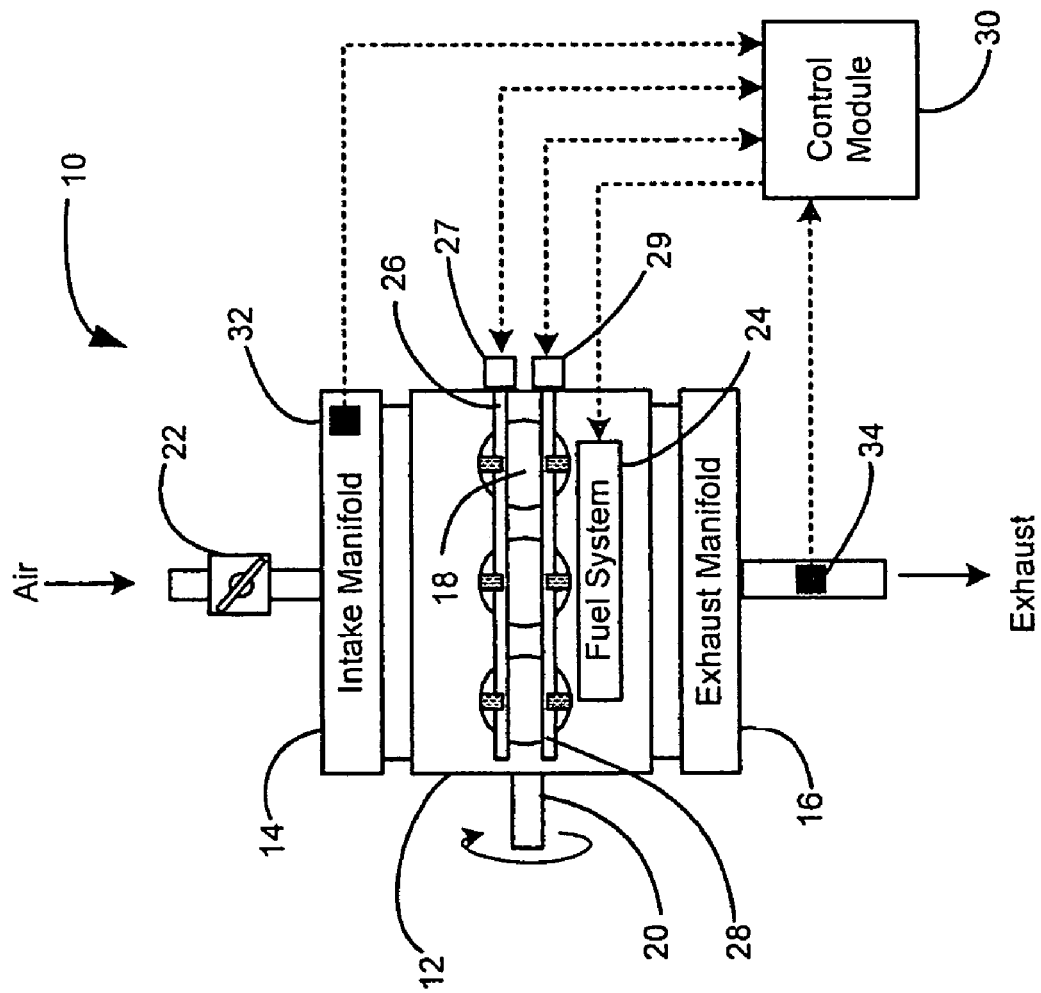
FIG. 1 is a functional block diagram of an internal combustion engine system including a dynamic engine control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an engine system 10 is schematically illustrated and includes an engine 12. The engine 12 includes an intake manifold 14, an exhaust manifold 16, a plurality of cylinders 18, a crankshaft 20 and a valvetrain (not shown). Air flows into the intake manifold 14 through a throttle 22 and is distributed to the cylinders 18. A fuel system 24 provides fuel to the cylinders 18 via fuel injectors (not shown). The fuel system 24 regulates an air-to-fuel ratio of the cylinders 18. The air/fuel mixture which is combusted within the cylinders 18 to drive pistons (not shown).

The crankshaft 20 is rotatably driven by the pistons during a combustion process. The crankshaft 20 rotatably drives the valvetrain via a timing chain (not shown). The valvetrain includes intake and exhaust camshafts 26,28, respectively, that respectively regulate intake and exhaust valves (not shown). Intake and exhaust camshaft phasers 27,29 are provided, and which respectively manipulate the rotational position of the intake and exhaust camshafts 26,28 relative to the rotational position of the crankshaft 20. More specifically, the intake camshaft 26, in particular, is operable in HI or LO modes, whereby the opening and closing angle of the intake valves vary based on the mode. For example, in the HI mode, the intake valves open when the crankshaft achieves one angle (e.g., 318°) and close when the crankshaft is at another angle (e.g., 112°). In the LO mode, the intake valves open when the crankshaft achieves one angle (e.g., 327°) and close when the crankshaft is at another angle (e.g., 175°). In short, the opening and closing of the intake valves are delayed in the LO mode, relative to the HI mode. The cam mode is selected based on engine speed and engine load. The LO mode is more fuel efficient and is selected during low engine speed and low load conditions (e.g., cruising). The HI mode is selected during high engine speed and high load conditions (e.g., heavy acceleration).

A control module 30 regulates operation of the engine 12 based on vehicle operating conditions. A manifold absolute pressure (MAP) sensor 32 is responsive to the pressure within the intake manifold 14 and generates a MAP signal to the control module. An exhaust pressure sensor 34 is responsive to the pressure within the exhaust manifold 16 or exhaust back pressure ($P_{EXH}$) and generates an exhaust pressure signal to the control module. Alternatively, exhaust back pressure can be calculated by the control module based on a barometric pressure signal generated by a barometric pressure sensor (not shown).

The control module 30 regulates operation of the engine 12 based on the engine control system of the present invention. More specially, the control module 30 regulates the engine to achieve a desired torque output that is based on the available torque ($T_{AVAIL}$) to drive the crankshaft. Torque is the net force acting in a cylinder at any instance during an engine combustion cycle. $T_{AVAIL}$ of the engine is equal to the sum of the instantaneous torques of the individual cylinders.

A more useful relative engine performance measure is mean effective pressure (MEP) that is determined by dividing the work per cycle by the cylinder volume displaced per cycle. MEP is defined as a constant pressure in the cylinders which, if exerted during the expansion stroke of the engine to produce work, would produce the equivalent work. MEP is calculated as work per engine cycle and can be characterized by the following equation:

$$MEP = \frac{W_{720°}}{EngDisplacement}$$

Combustion chamber pressures that occur in cylinders during all phases of the combustion cycle of a cylinder are averaged to obtain MEP. More specifically, MEP includes a set of individual MEPs including an indicated mean effective pressure (IMEP), a frictional mean effective pressure (FMEP), a motoring mean effective pressure (MMEP) and a pumping mean effective pressure (PMEP).

The work that is available to drive the crankshaft can be defined in terms of a brake MEP (BMEP). BMEP can be calculated as the sum of IMEP, PMEP and FMEP. IMEP is corresponds to the work produced by combustion that is available to act on a piston. More specifically, IMEP corresponds to the work available over the 360° of the compression and expansion strokes. A net MEP (NMEP) corresponds to a net work available over the entire 720° of the engine cycle. NMEP is the net useful work produced by the combustion and airflow process and is equal to the sum of IMEP and PMEP. FMEP corresponds with the work consumed by an engine over the entire 720° of the engine cycle. More specifically, FMEP includes mechanical friction, crankcase pumping, windage, oil and water pump drives and parasitic losses.

As discussed above, BMEP is partially based on PMEP. PMEP corresponds to the work done by a piston to pull fresh charge into a cylinder and eject spent charge from a cylinder and may be characterized by the following equation:

$$PMEP = \frac{W_{P\_720°}}{EngDisplacement}$$

where $W_{P\_720°}$ is the pumping work done by the engine. $W_{P\_720°}$ can be characterized by the following equation:

$$W_{P\_720°} = \oint_{720°} P \frac{dV}{dt}$$

where P is the pressure within the cylinder and V is the displaced volume of the cylinder.

$W_{P\_720°}$ can be defined as a summation of intake pumping work and exhaust pumping work, as stated in the following equation:

$$W_{P\_720°} \cong \oint_{720°} P_I \frac{dV_I}{dt} + P_E \frac{dV_E}{dt}$$

where $P_I$ is the intake pressure, $P_E$ is the exhaust pressure, $dV_I/dt$ is the change in intake displaced volume and $dV_E/dt$ is the change in exhaust displaced volume.

It can be assumed that $P_I$ is approximately constant over the intake stroke and that $P_E$ is approximately constant over the exhaust stroke. These assumptions provide the following simplified equation:

$$W_{P\_720°} \cong P_I(V_{IVC}-V_{IVO}) + P_E(V_{EVC}-P_{EVO})$$

where $V_{IVC}$ is cylinder displaced volume at the time of intake valve closing (IVC), $V_{IVO}$ is cylinder displaced volume at the time of intake valve opening (IVO), $V_{EVC}$ is cylinder displaced volume at the time of exhaust valve closing (EVC) and $V_{EVO}$ is cylinder displaced volume at the time of exhaust valve opening (EVO).

A pumping torque ($T_P$) can be determined based on PMEP. Because $T_P$ affects $T_{AVAIL}$, operation of the engine is at least partially based on $T_P$. $T_P$ is determined based on the following equation:

$$T_P = \frac{PMEP * EngDisplacement}{4\pi}$$

In terms of $W_{p\_720°}$, $T_P$ is defined as:

$$T_P = \frac{W_{p\_720°}}{4\pi}$$

By determining $W_{p\_720°}$, $T_P$ can be determined and be used in torque-based regulation of the engine.

Figure 2:
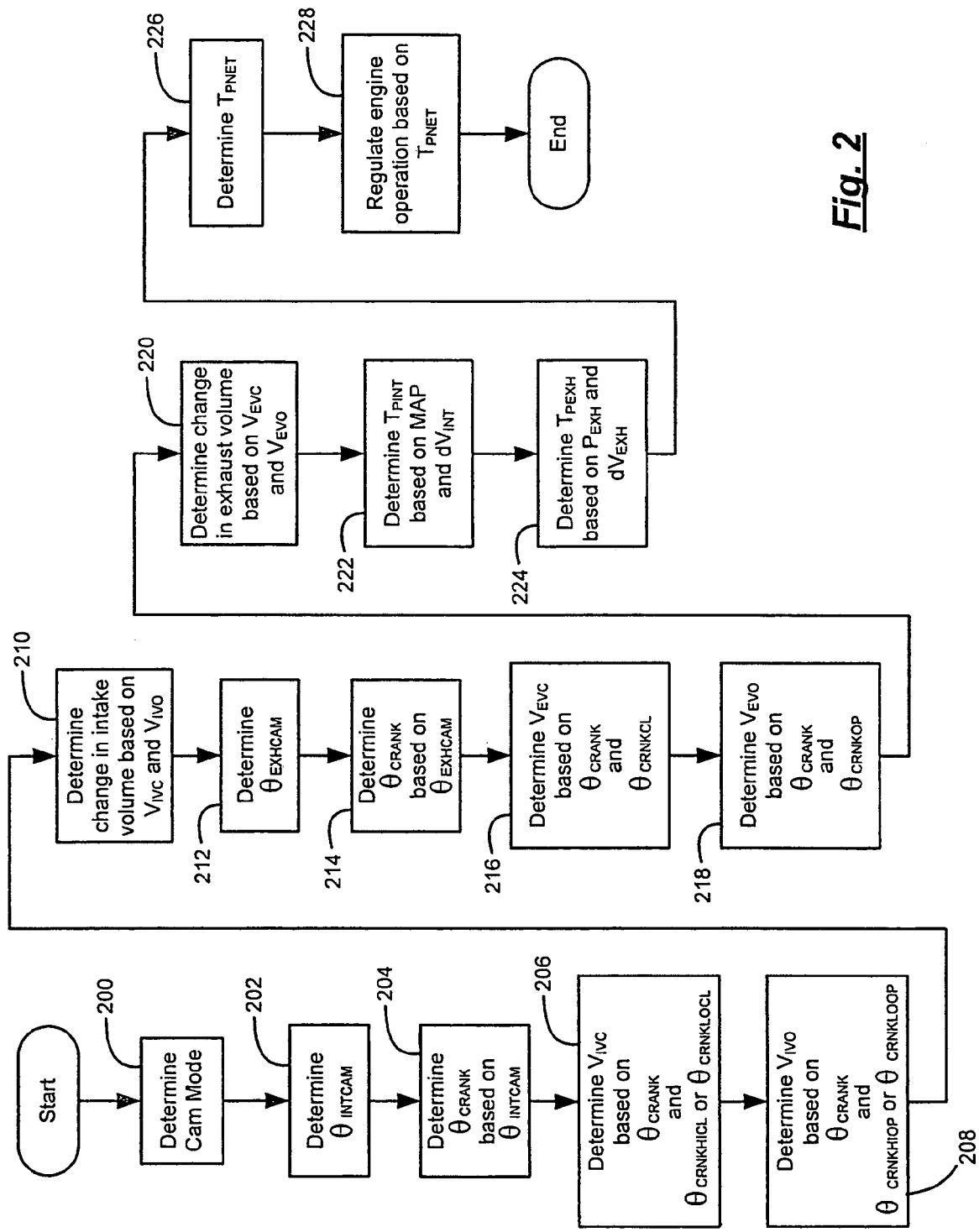
FIG. 2 is a flow chart illustrating steps executed by the engine control system of the present invention.

Referring now to FIG. 2, a flowchart illustrates the steps executed by the engine control system of the present invention. In step 200, control determines the cam mode (e.g., HI/LO). In step 202, control determines the intake cam angle ($\theta_{INTCAM}$). $\theta_{INTCAM}$ can be determined based on a sensor integrated into the camphaser 27. Control determines the crankshaft angle ($\theta_{CRANK}$) based on $\theta_{INTCAM}$ in step 204. In step 206, control determines the cylinder volume at intake valve closure ($V_{IVC}$) based on $\theta_{CRANK}$ and a crankshaft angle constant at close. The crankshaft angle constant is based on the cam mode and is either a crankshaft angle at close in HI mode ($\theta_{CRNKHICL}$) (e.g., 112°) or a crankshaft angle at close in LO mode ($\theta_{CRNKLOCL}$) (e.g., 175°).

In step 208, control determines the cylinder volume at intake valve opening ($V_{IVO}$) based on $\theta_{CRANK}$ and a crankshaft angle constant at opening. The crankshaft angle constant is based on the cam mode and is either a crankshaft angle at opening in HI mode ($\theta_{CRNKHIOP}$) (e.g., 318°) or a crankshaft angle at opening in LO mode ($\theta_{CRNKLOOP}$) (e.g., 327°). In step 210, control determines a change in cylinder volume during intake ($dV_{INT}$) based on $V_{IVC}$ and $V_{IVO}$.

In step 212, control determines the exhaust camshaft angle ($\theta_{EXHCAM}$). $\theta_{EXHCAM}$ can be determined based on a sensor integrated into the camphaser 29. In step 214, control determines $\theta_{CRANK}$ based on $\theta_{EXHCAM}$. Control determines the cylinder volume at exhaust valve closure ($V_{EVC}$) based on $\theta_{CRANK}$ and a crankshaft angle constant at closure ($\theta_{CRNKCL}$) (e.g., 361°) in step 216. In step 218, control determines the cylinder volume at exhaust valve opening ($V_{EVO}$) based on $\theta_{CRANK}$ and a crankshaft angle constant at opening ($\theta_{CRNKOP}$) (e.g., 609°). In step 220, control determines a change in cylinder volume during exhaust ($dV_{EXH}$) based on $V_{EVC}$ and $V_{EVO}$.

In step 222, control determines an intake pumping torque ($T_{PINT}$) based on $dV_{INT}$ and MAP. Control determines an exhaust pumping torque ($T_{PEXH}$) based on $dV_{EXH}$ and $P_{EXH}$. Control determines a net pumping torque ($T_{PNET}$) based on $T_{PINT}$ and $T_{PEXH}$ in step 226. In step 228, engine operation is regulated based on $T_{PNET}$. More specifically, control uses $T_{PNET}$ to calculate $T_{AVAIL}$.

Figure 3:
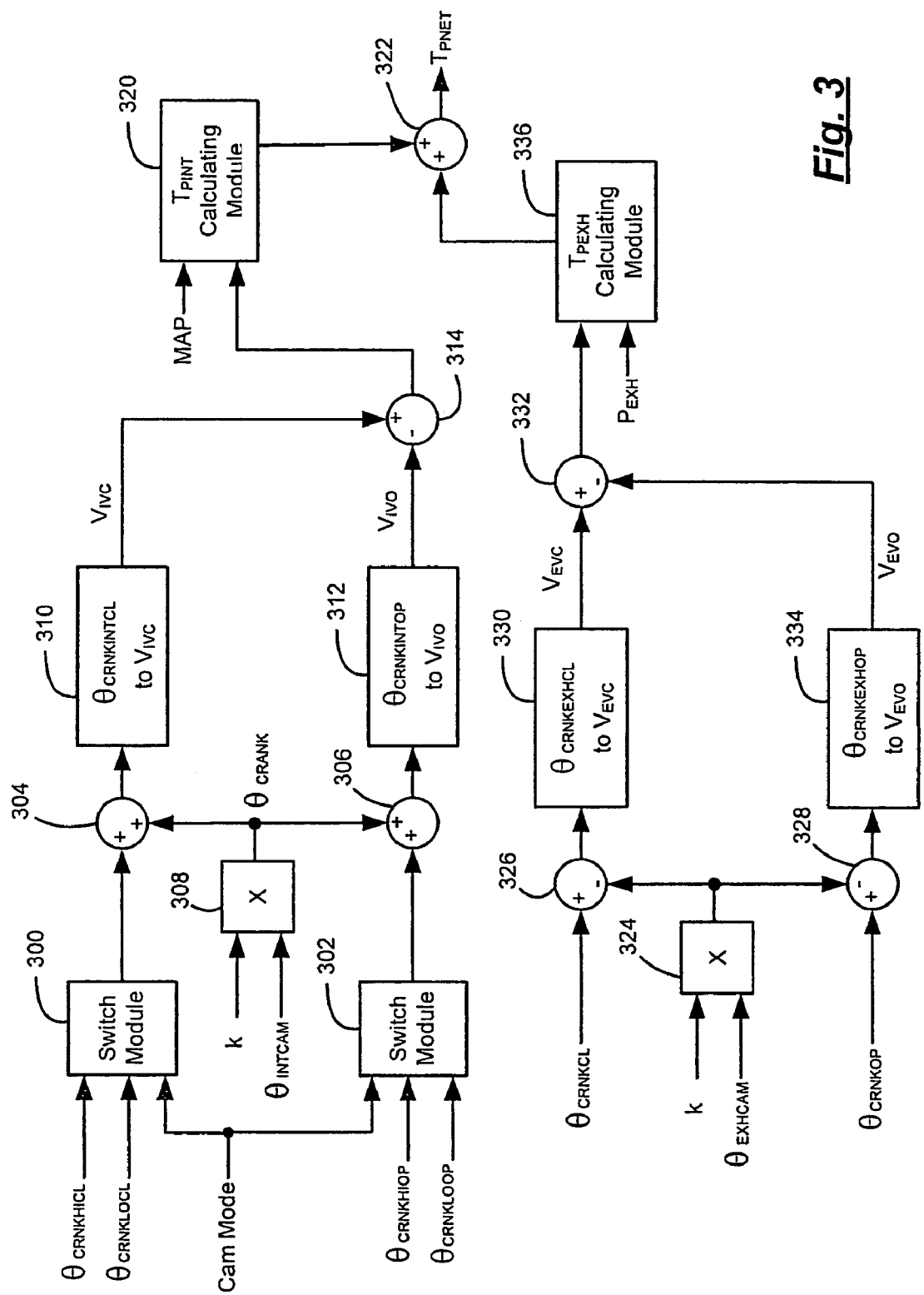
FIG. 3 is a signal flow diagram illustrating pumping torque calculation executed by the engine pumping algorithm of the present invention.

Referring now to FIG. 3, a signal flow diagram illustrates calculation of $T_{PNET}$. The pre-determined parameters (i.e., $\theta_{CRNKHICL}$ and $\theta_{CRNKLOCL}$) defining the closing angles of the intake valves are input to a switch module 300. The pre-determined parameters (i.e., $\theta_{CRNKHIOP}$ and $\theta_{CRNKLOOP}$) defining the opening angles of the intake valves are input to a switch module 302. A cam mode signal is input to both switch modules 300,302. The switch module 300 passes one of $\theta_{CRNKHICL}$ and $\theta_{CRNKLOCL}$ based on the cam mode and the switch module 302 passes one of $\theta_{CRNKHIOP}$ and $\theta_{CRNKLOOP}$ based on the cam mode. The output of the switch module 300 is provided to a summer 304 and the output of the switch module 302 is output to a summer 306.

$\theta_{INTCAM}$ and a crankshaft angle conversion constant (k) are input to a multiplier 308. The multiplier determines $\theta_{CRANK}$ based on $\theta_{INTCAM}$ and k. $\theta_{CRANK}$ is provided to the summers 304, 306. The summer 304 determines a crankshaft angle at intake valve closure ($\theta_{CRNKINTCL}$) and outputs $\theta_{CRNKINTCL}$ to a conversion module 310. The conversion module 310 determines $V_{IVC}$ based on $\theta_{CRNKINTCL}$. The conversion module 310 outputs $V_{IVC}$ to a summer 314. The summer 306 determines a crankshaft angle at intake valve opening ($\theta_{CRNKINTOP}$) and outputs $\theta_{CRNKINTOP}$ to a conversion module 312. The conversion module 312 determines $V_{IVO}$ based on $\theta_{CRNKINTOP}$. The conversion module 312 outputs $V_{IVO}$ to the summer 314.

The summer 314 determines $dV_{INT}$ as the difference between $V_{IVC}$ and $V_{IVO}$. $dV_{INT}$ is output to a $T_{PINT}$ calculating module 320. The $T_{PINT}$ calculating module determines $T_{PINT}$ based on $dV_{INT}$, MAP and other factors including, but not limited to, engine displacement, a unit conversion factor and $\pi$. $T_{PINT}$ is output to a summer 322.

$\theta_{EXHCAM}$ and a crankshaft angle conversion constant (k) are input to a multiplier 324. The multiplier determines $\theta_{CRANK}$ based on $\theta_{EXHCAM}$ and k. $\theta_{CRANK}$ is provided to summers 326 and 328. The summer 326 determines a crankshaft angle at exhaust valve closure ($\theta_{CRNKEXHCL}$) based on $\theta_{CRANK}$ and a crankshaft closure angle ($\theta_{CRANKCL}$), and outputs $\theta_{CRNKEXHCL}$ to a conversion module 330. The conversion module 330 determines $V_{EVC}$ based on $\theta_{CRNKEXHCL}$. The conversion module 330 outputs $V_{EVC}$ to a summer 332. The summer 328 determines a crankshaft angle at exhaust valve opening ($\theta_{CRNKEXHOP}$) based on $\theta_{CRANK}$ and a crankshaft opening angle ($\theta_{CRANKOP}$), and outputs $\theta_{CRNKEXHOP}$ to a conversion module 334. The conversion module 334 determines $V_{EVO}$ based on $\theta_{CRNKEXHOP}$. The conversion module 334 outputs $V_{EVO}$ to the summer 332.

The summer 334 determines $dV_{EXH}$ as the difference between $V_{EVC}$ and $V_{EVO}$. $dV_{EXH}$ is output to a $T_{PEXH}$ calculating module 336. The $T_{PEXH}$ calculating module determines $T_{PEXH}$ based on $dV_{EXH}$, $P_{EXH}$ and other factors including, but not limited to, engine displacement, a unit conversion factor and $\pi$. $T_{PEXH}$ is output to the summer 322. The summer 322 determines $T_{PNET}$ based on $T_{PINT}$ and $T_{PEXH}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed:

1. An engine control system that regulates operation of an engine, comprising:
   an intake valve that regulates air intake into a cylinder of said engine;
   an exhaust valve that regulates exhaust from said cylinder; and
   a control module that determines a cylinder volume at intake valve closure and a cylinder volume at intake valve opening, that calculates an intake pumping torque based on said cylinder volume at intake valve closure and said cylinder volume at intake valve opening, that determines a cylinder volume at exhaust valve closure and a cylinder volume at exhaust valve opening, that calculates an exhaust pumping torque based on said cylinder volume at exhaust valve closure and said cylinder volume at exhaust valve opening, that calculates a net pumping torque based on said intake pumping torque and said exhaust pumping torque and that regulates engine operation based on said net pumping torque.

2. The engine control system of claim 1 wherein said control module determines a crankshaft intake closure angle at intake valve closure, wherein said cylinder volume at intake valve closure is determined based on said crankshaft intake closure angle and determines a crankshaft intake opening angle at intake valve opening, wherein said cylinder volume at intake valve opening is determined based on said crankshaft intake opening angle.

3. The engine control system of claim 2 further comprising:
   an intake camshaft that regulates opening and closing of said intake valve relative to a crankshaft angle; and
   a sensor that monitors an intake camshaft angle;
   wherein said control module determines said crankshaft angle based on said intake camshaft angle, and wherein each of said crankshaft intake closure angle and said crankshaft intake opening angle are determined based on said crankshaft angle.

4. The engine control system of claim 1 wherein said control module determines a crankshaft exhaust closure angle at exhaust valve closure, wherein said cylinder volume at exhaust valve closure is determined based on said crankshaft exhaust closure angle, and determines a crankshaft exhaust opening angle at exhaust valve opening, wherein said cylinder volume at exhaust valve opening is determined based on said crankshaft exhaust opening angle.

5. The engine control system of claim 4 further comprising:
   an exhaust camshaft that regulates opening and closing of said exhaust valve relative to a crankshaft angle; and
   a sensor that monitors an exhaust camshaft angle;
   wherein said control module determines said crankshaft angle based on said exhaust camshaft angle, and wherein each of said crankshaft exhaust closure angle and said crankshaft exhaust opening angle are determined based on said crankshaft angle.

6. The engine control system of claim 1 further comprising a manifold absolute pressure sensor that monitors a manifold absolute pressure of an intake manifold of said engine, wherein said intake pumping torque is calculated based on said manifold absolute pressure.

7. The engine control system of claim 1 wherein said control module determines an exhaust pressure, wherein said exhaust pumping torque is calculated based on said manifold absolute pressure.

8. A method of dynamically regulating operation of an internal combustion engine, comprising:
   determining a cylinder volume at intake valve closure;
   determining a cylinder volume at intake valve opening;
   calculating an intake pumping torque based on said cylinder volume at intake valve closure and said cylinder volume at intake valve opening;
   determining a cylinder volume at exhaust valve closure;
   determining a cylinder volume at exhaust valve opening;
   calculating an exhaust pumping torque based on said cylinder volume at exhaust valve closure and said cylinder volume at exhaust valve opening;
   calculating a net pumping torque based on said intake pumping torque and said exhaust pumping torque; and
   regulating engine operation based on said net pumping torque.

9. The method of claim 8 further comprising:
   determining a crankshaft intake closure angle at intake valve closure, wherein said cylinder volume at intake valve closure is determined based on said crankshaft intake closure angle; and
   determining a crankshaft intake opening angle at intake valve opening, wherein said cylinder volume at intake valve opening is determined based on said crankshaft intake opening angle.

10. The method of claim 9 further comprising determining a crankshaft angle based on an intake camshaft angle, wherein each of said crankshaft intake closure angle and said crankshaft intake opening angle are determined based on said crankshaft angle.

11. The method of claim 8 further comprising:
    determining a crankshaft exhaust closure angle at exhaust valve closure, wherein said cylinder volume at exhaust valve closure is determined based on said crankshaft exhaust closure angle; and
    determining a crankshaft exhaust opening angle at exhaust valve opening, wherein said cylinder volume at exhaust valve opening is determined based on said crankshaft exhaust opening angle.

12. The method of claim 11 further comprising determining a crankshaft angle based on an exhaust camshaft angle, wherein each of said crankshaft exhaust closure angle and said crankshaft exhaust opening angle are determined based on said crankshaft angle.

13. The method of claim 8 further comprising:
    monitoring a manifold absolute pressure of an intake manifold of said engine, wherein said intake pumping torque is calculated based on said manifold absolute pressure; and
    determining an exhaust pressure, wherein said exhaust pumping torque is calculated based on said manifold absolute pressure.

14. A method of dynamically regulating operation of an internal combustion engine, comprising:
    monitoring an intake camshaft angle;
    determining a cylinder volume at intake valve closure and a cylinder volume at intake valve opening based on said intake camshaft angle;
    calculating an intake pumping torque based on said cylinder volume at intake valve closure and said cylinder volume at intake valve opening;
    monitoring an exhaust camshaft angle;
    determining a cylinder volume at exhaust valve closure and a cylinder volume at exhaust valve opening based on said exhaust camshaft angle;
    calculating an exhaust pumping torque based on said cylinder volume at exhaust valve closure and said cylinder volume at exhaust valve opening;
    calculating a net pumping torque based on said intake pumping torque and said exhaust pumping torque; and
    regulating engine operation based on said net pumping torque.

15. The method of claim 14 further comprising:
- determining a crankshaft intake closure angle at intake valve closure, wherein said cylinder volume at intake valve closure is determined based on said crankshaft intake closure angle; and
- determining a crankshaft intake opening angle at intake valve opening, wherein said cylinder volume at intake valve opening is determined based on said crankshaft intake opening angle.

16. The method of claim 15 further comprising determining a crankshaft angle based on said intake camshaft angle, wherein each of said crankshaft intake closure angle and said crankshaft intake opening angle are determined based on said crankshaft angle.

17. The method of claim 14 further comprising:
- determining a crankshaft exhaust closure angle at exhaust valve closure, wherein said cylinder volume at exhaust valve closure is determined based on said crankshaft exhaust closure angle; and
- determining a crankshaft exhaust opening angle at exhaust valve opening, wherein said cylinder volume at exhaust valve opening is determined based on said crankshaft exhaust opening angle.

18. The method of claim 17 further comprising determining a crankshaft angle based on said exhaust camshaft angle, wherein each of said crankshaft exhaust closure angle and said crankshaft exhaust opening angle are determined based on said crankshaft angle.

19. The method of claim 14 further comprising:
- monitoring a manifold absolute pressure of an intake manifold of said engine, wherein said intake pumping torque is calculated based on said manifold absolute pressure; and
- determining an exhaust pressure, wherein said exhaust pumping torque is calculated based on said manifold absolute pressure.

* * * * *